United States Patent
Otaki et al.

(10) Patent No.: US 6,860,827 B2
(45) Date of Patent: Mar. 1, 2005

(54) ACTUATOR DEVICE FOR MANIPULATING MOVABLE MEMBER

(75) Inventors: Ryoichi Otaki, Fujisawa (JP); Hideki Hashitani, Hanyu (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/838,502

(22) Filed: May 4, 2004

(65) Prior Publication Data

US 2004/0204271 A1 Oct. 14, 2004

Related U.S. Application Data

(63) Continuation of application No. PCT/JP02/11674, filed on Nov. 8, 2002.

(30) Foreign Application Priority Data

Nov. 12, 2001 (JP) ........................................ 2001-346518

(51) Int. Cl.[7] .............................................. F16H 61/00
(52) U.S. Cl. ..................................... 474/39; 74/424.83
(58) Field of Search ......................... 74/89.15, 424.8 R, 74/424.75, 424.81; 474/18, 28, 39, 40

(56) References Cited

U.S. PATENT DOCUMENTS

| | | | |
|---|---|---|---|
| 4,735,598 A | | 4/1988 | Moroto et al. |
| 5,193,409 A | * | 3/1993 | Babinski .................. 74/424.83 |
| 5,749,265 A | * | 5/1998 | Namimatsu et al. ..... 74/424.75 |
| 6,468,170 B1 | * | 10/2002 | Ito ............................... 474/18 |
| 6,584,869 B2 | * | 7/2003 | Grosspietsch et al. ... 74/424.75 |

FOREIGN PATENT DOCUMENTS

| | | | | |
|---|---|---|---|---|
| JP | 63101558 A | * | 5/1988 | ............. F16H/9/12 |
| JP | 6-249309 A | | 9/1994 | |
| JP | 7-119805 A | | 5/1995 | |
| JP | 60-173753 U | | 11/1995 | |
| JP | 8-33170 B2 | | 3/1996 | |
| JP | 2852994 B2 | | 11/1998 | |
| JP | 2002-130417 A | | 5/2002 | |
| JP | 2003-97656 A | | 4/2003 | |
| JP | 2003-120782 A | | 4/2003 | |

* cited by examiner

Primary Examiner—David A. Bucci
Assistant Examiner—Vicky A. Johnson
(74) Attorney, Agent, or Firm—Christensen O'Connor Johnson Kindness PLLC

(57) ABSTRACT

In an actuator device which comprises a screw shaft, a nut member, and balls, the nut member moves relatively to the screw shaft in a first axial direction and a second axial direction opposite thereto in a manner such that it is continually subjected to a load in the first axial direction. A ball screw groove of the screw shaft is formed having a loaded surface which is pressed against the balls, on the side of a groove base in the first axial direction. A ball screw groove of the nut member is having a loaded surface which is pressed against the balls, on the side of its groove base in the second axial direction. These loaded surfaces are finished so that their surface roughness is lower than that of the unloaded surfaces.

4 Claims, 2 Drawing Sheets

ACTUATOR DEVICE FOR MANIPULATING MOVABLE MEMBER

CROSS-REFERENCE TO RELATED APPLICATIONS

This is a Continuation Application of PCT Application No. PCT/JP02/11674, filed Nov. 8, 2002, which was not published under PCT Article 21(2) in English.

This application is based upon and claims the benefit of priority from prior Japanese Patent Application No. 2001-346518, filed Nov. 12, 2001, the entire contents of which are incorporated herein by reference.

BACKGROUND OF THE INVENTION

1. Field of the Invention

This invention relates to actuator devices for movable member manipulation, used in belt-type continuously variable transmissions of automobiles and industrial machines and the like, for example.

2. Description of the Related Art

Belt-type continuously variable transmissions may be used in some automobiles, industrial machines, etc. One such belt-type continuously variable transmission comprises a pulley (primary pulley) located on a rotating shaft on the driving side, a pulley (secondary pulley) on a rotating shaft on the driven side, and an endless belt stretched around these pulleys.

Each of the pulleys includes a fixed pulley disk for use as a fixed member and a movable pulley disk as a movable member, which are opposed to each other. The fixed pulley disk is provided integrally on the rotating shaft. The movable pulley disk is mounted on the rotating shaft so as to be nonrotatable and movable in the axial direction. The movable pulley disk is moved in the axial direction of the rotating shaft by means of an actuator. This movement changes the distance between the fixed pulley disk and the movable pulley disk, that is, pulley width.

In order to change the ratio between the respective rotational speeds of the driving-side rotating shaft and the driven-side rotating shaft, the pulley width on the driving side and the pulley width on the driven side are synchronously changed in opposite directions. In shifting the secondary pulley to the speed increasing side, for example, the pulley width of the primary pulley is reduced, while the pulley width of the secondary pulley is increased. If this is done, the endless belt moves toward the outer periphery of the primary pulley, and the endless belt moves toward the center of the secondary pulley.

A ball screw mechanism is used as the actuator that moves the movable pulley disk in the axial direction of the rotating shaft. The ball screw mechanism is provided with a cylindrical screw shaft on the outer periphery of the rotating shaft and a nut member that is threadedly engaged with the outer periphery of the screw shaft with a plurality of balls between them. The screw shaft is fixed to a transmission case for use as a supporting member. The nut member is rotatable with respect to the movable pulley disk and movable integrally with the movable pulley disk in the axial direction of the rotating shaft.

Ball screw grooves are formed individually on the outer peripheral surface of the screw shaft and the inner peripheral surface of the nut member. The balls are arranged along the ball screw groove of the screw shaft and the ball screw groove of the nut member between these ball screw grooves. If the nut member rotates, the balls roll along the ball screw grooves, and the nut member moves in the axial direction of the screw shaft.

One end portion of the nut member is fitted in a boss portion of the movable pulley disk by means of a bearing. The nut member is rotatable with respect to the movable pulley disk and movable integrally with the movable pulley disk in the axial direction of the rotating shaft.

If the nut member is rotated by means of a drive source such as a motor, the nut member moves integrally with the movable pulley disk in the axial direction of the rotating shaft. The pulley width between the movable pulley disk and the fixed pulley disk is changed by this movement.

In the power transmission apparatus in which the endless belt is passed around and between the movable pulley disk and the fixed pulley disk, a component of force based on the tension of the belt always acts in the direction (first axial direction) to move the movable pulley disk away from the fixed pulley disk. Thus, the nut member moves in the first axial direction and in a second axial direction opposite to it in a manner such that it is subjected to a load in the first axial direction. If the nut member moves in the first axial direction, the distance from the movable pulley disk to the fixed pulley disk increases. If the nut member moves in the second direction, on the other hand, the distance from the movable pulley disk to the fixed pulley disk decreases.

FIG. 4 is an enlarged view of a principal part of a conventional ball screw mechanism. Ball screw grooves $a_1$ and $b_1$ are formed on the outer peripheral surface of the screw shaft a and the inner peripheral surface of a nut member b, respectively. A plurality of balls c are rollably accommodated between the ball screw grooves $a_1$ and $b_1$.

If the nut member b rotates with respect to the screw shaft a, the balls c roll in the ball screw grooves $a_1$ and $b_1$ as they spirally move along the screw grooves $a_1$ and $b_1$. Thereupon, the nut member b moves in the axial direction of the screw shaft a.

As shown in FIG. 4, the cross section of each of the conventional ball screw grooves $a_1$ and $b_1$ has the shape of a Gothic arch. Each ball c is in contact with four points A, B, C and D on surfaces on the opposite sides of groove bases d and e of the ball screw grooves $a_1$ and $b_1$. The nut member b moves with respect to the screw shaft a in the first axial direction or the opposite second axial direction, depending on its rotating direction. During this movement, the ball c is pressed against the points A, B, C and D of the ball screw grooves $a_1$ and $b_1$, so that the load of power transmission acts on these points. Conventionally, therefore, the ball screw grooves $a_1$ and $b_1$ are entirely finished by precise polishing or grinding, in order to reduce friction that is caused by contact with the ball c.

In the ball screw mechanism in which the load in the first axial direction acts always on the nut member, as in the belt-type continuously variable transmission, each ball is pressed against specific surfaces of the ball screw grooves without regard the moving direction of the nut member. Conventionally, however, the ball screw grooves are entirely finished, so that the finishing work requires much labor, the operating efficiency is poor, and the manufacturing cost is high.

Accordingly, the object of this invention is to provide an actuator device of which a screw shaft and a nut member can be worked with ease.

BRIEF SUMMARY OF THE INVENTION

The present invention is an actuator device for manipulating a movable member, which comprises a screw shaft having a ball screw groove formed on the outer peripheral surface thereof, a nut member located on the outer periphery of the screw shaft and having a ball screw groove formed on the inner peripheral surface thereof and a plurality of balls accommodated between the ball screw groove of the screw shaft and the ball screw groove of the nut member. The nut member moves relatively to the screw shaft in a first axial direction and a second axial direction opposite thereto in a manner such that the nut member is continually subjected to a load in the first axial direction. The ball screw groove of the screw shaft has a loaded surface, which is formed on the side of a groove base thereof in the first axial direction and pressed against the balls by the load in the first axial direction, and an unloaded surface formed on the side of the groove base in the second axial direction. The ball screw groove of the nut member has a loaded surface, which is formed on the side of a groove base thereof in the second axial direction and pressed against the balls by the load in the first axial direction, and an unloaded surface formed on the side of the groove base in the first axial direction. Only the loaded surfaces, out of the respective loaded surfaces and unloaded surfaces of the ball screw grooves, are finished so that the surface roughness thereof is lower than that of the unloaded surfaces.

According to this invention, the problems involved in finishing the ball screw grooves can be eased.

In a preferred aspect of this invention, the surface roughness of the finished loaded surfaces is lower than the surface roughness of the machined unloaded surfaces.

An example of the movable member is a movable pulley disk for a belt-type continuously variable transmission. This belt-type continuously variable transmission has the cylindrical screw shaft fixed to a supporting member, the nut member provided on the outer periphery of the screw shaft, a rotating shaft inserted into the screw shaft in the axial direction thereof and rotatable with respect to the screw shaft, a fixed pulley disk which rotates integrally with the rotating shaft, and the movable pulley disk provided on the rotating shaft so as to face the fixed pulley disk and movable integrally with the nut member in the axial direction of the rotating shaft.

DETAILED DESCRIPTION OF THE INVENTION

A belt-type continuously variable transmission according to an embodiment of this invention will now be described with reference to FIGS. 1 to 3.

Figure 1:
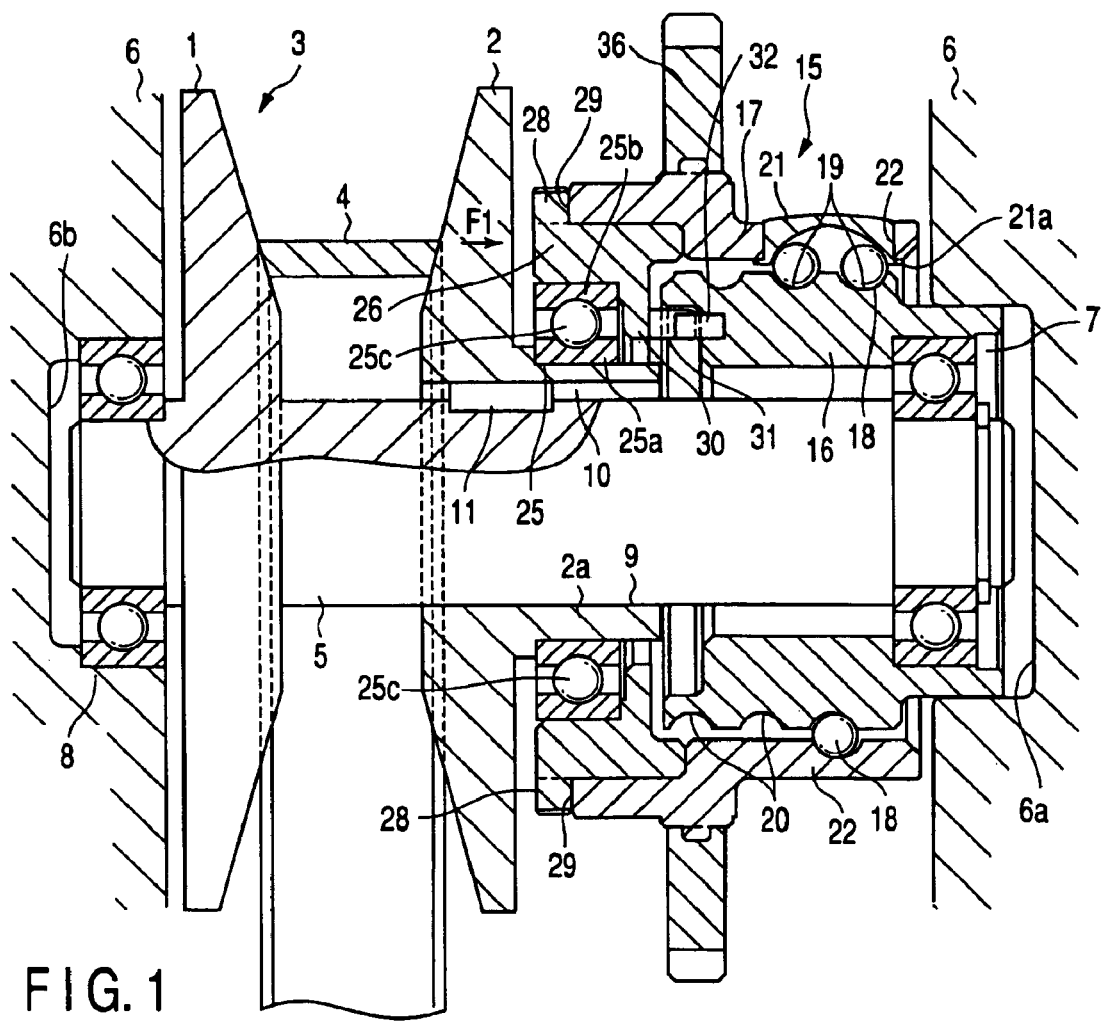
FIG. 1 is a sectional view of a belt-type continuously variable transmission according to an embodiment of this invention.

FIG. 1 shows a pulley width adjusting device in the belt-type continuously variable transmission. This pulley width adjusting device includes a pulley 3 which comprises a fixed pulley disk 1 for use as a fixed member and a movable pulley disk 2 as a movable member. An endless belt 4 is passed around the pulley 3.

The pulley 3 has a rotating shaft 5. The opposite end portions of the rotating shaft 5 are rotatably supported on a transmission case 6 for use as a supporting member by means of bearings 7 and 8, individually. The bearings 7 and 8 are fitted and fixed, respectively, in recesses 6a and 6b that are formed in the transmission case 6.

The fixed pulley disk 1 is formed integrally on the rotating shaft 5. The movable pulley disk 2 is opposed to the fixed pulley disk 1. The movable pulley disk 2 is located on the outer periphery of the rotating shaft 5 so as to be nonrotatable and movable in the axial direction of the rotating shaft 5.

More specifically, the movable pulley disk 2 has a fitting hole 9 in its central portion. The fitting hole 9 is slidably fitted on the rotating shaft 5. A key groove 10 is formed on the peripheral surface of the fitting hole 9 so as to extend in its axial direction. A key 11 is attached to the peripheral surface of the rotating shaft 5 so as to extend in its axial direction. The key 11 is slidably fitted in the key groove 10. Thus, the movable pulley disk 2 is supported so as to be movable in the axial direction of the rotating shaft 5 and nonrotatable relative to the rotating shaft 5.

A ball screw mechanism 15 is located between the movable pulley disk 2 and the transmission case 6. The ball screw mechanism 15 serves as an actuator that moves the movable pulley disk 2 in the axial direction. The ball screw mechanism 15 is provided with a cylindrical screw shaft 16, a nut member 17, and a plurality of balls 18 as rolling elements. The hollow screw shaft 16 is located coaxially around the rotating shaft 5. One end portion of the screw shaft 16 is fitted in the recess 6a of the transmission case 6. The bearing 7 is located between the one end portion of the screw shaft 16 and the rotating shaft 5.

The nut member 17 is located coaxially around the screw shaft 16. Spiral ball screw grooves 19 and 20 are formed on the outer peripheral surface of the screw shaft 16 and the inner peripheral surface of the nut member 17, respectively. The balls 18 are rollably set between the ball screw grooves 19 and 20. The balls 18 are arranged along the ball screw grooves 19 and 20.

If the nut member 17 rotates, therefore, the balls 18 roll along the ball screw groove 19 and 20, and the nut member 17 moves in the axial direction of the screw shaft 16. More specifically, the nut member 17 moves relatively to the screw shaft 16 in a first axial direction F1 and a second axial direction F2 opposite to it.

The ball screw groove 19 of the cylindrical screw shaft 16 is formed having a spiral length for a plurality of pitches. On the other hand, the ball screw groove 20 of the nut member 17 is formed having a spiral length for one pitch. A deflector 21 for infinitely circulating the balls 18 is located on a part of the peripheral surface of the nut member 17. The deflector 21 has a function to return the balls 18, which roll along the ball screw groove 20 for one pitch of the nut member 17, from one end portion of the ball screw groove 20 to the other end portion and infinitely circulate them.

The deflector 21 is formed of an injection-molded piece of resin or sintered metal. A flange 21a is formed on the inner peripheral edge portion of the deflector 21. A fitting opening 22 corresponding to the deflector 21 is formed in a part of the peripheral surface of the nut member 17. The deflector 21 is fitted into the fitting opening 22 from inside the nut member 17 and fixed to the nut member 17. The flange 21a is in contact with the inner peripheral surface of the nut member 17.

Thus, the ball screw mechanism 15 is a deflector-type ball screw structure of a single-thread, single-column deflector type. Therefore, the ball screw mechanism 15 has a compact axial dimension, and can permit a slight inclination between the screw shaft 16 and the nut member 17. The ball screw mechanism 15 constructed in this manner is advantageous to a moment load generated in the pulley 3.

Figure 2:
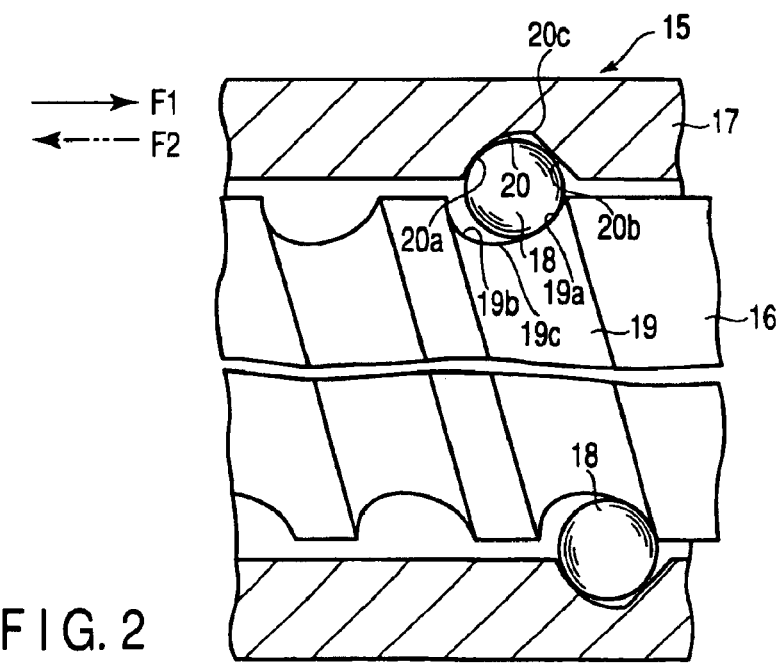
FIG. 2 is a sectional view showing a part of a ball screw mechanism in the belt-type continuously variable transmission shown in FIG. 1.

FIG. 2 shows a principal part of the ball screw mechanism 15. FIG. 3 is a partial enlarged view showing the principal part.

In the ball screw groove 20 formed on the nut member 17, a surface on one side of its groove base 20c forms a loaded surface 20a, and a surface on the other side forms an unloaded surface 20b. The loaded surface 20a is situated on that side of the groove base 20c of the ball screw groove 20 in the second axial direction F2. The unloaded surface 20b is situated on that side of the groove base 20c of the ball screw groove 20 in the first axial direction F1.

In other words, the loaded surface 20a is situated nearer to the fixed pulley disk 1 with respect to the groove base 20c of the ball screw groove 20, while the unloaded surface 20b is situated more remotely from the fixed pulley disk 1 with respect to the groove base 20c.

Figure 3:
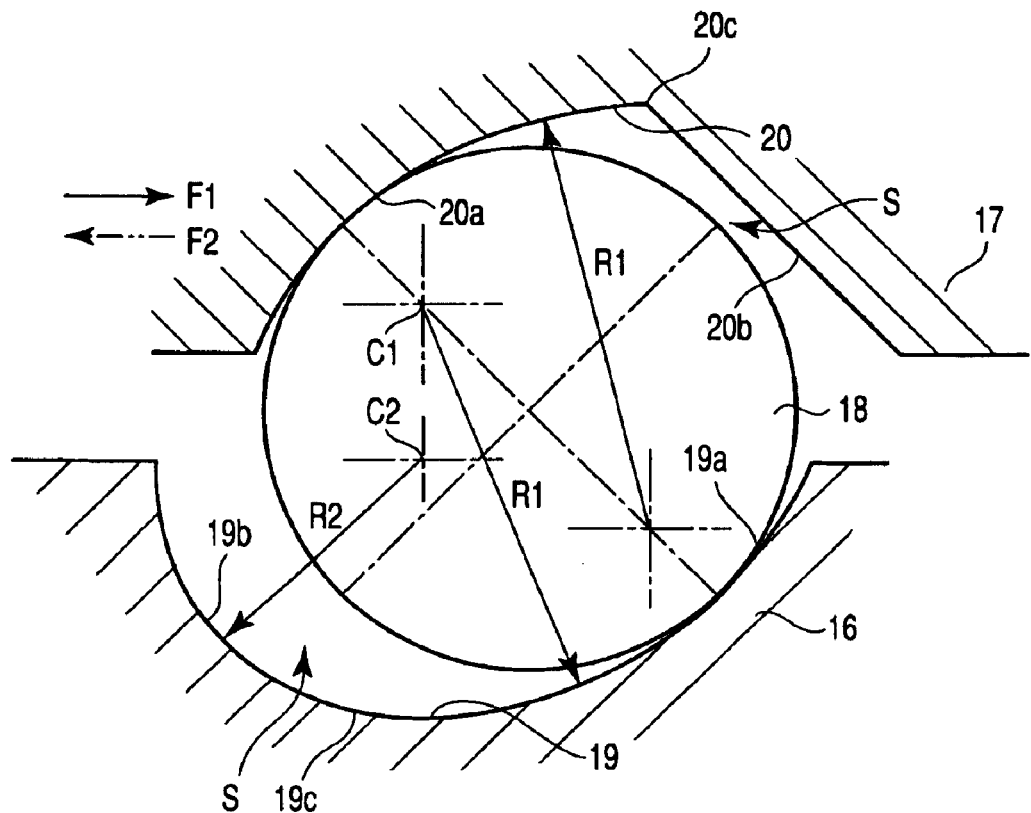
FIG. 3 is an enlarged sectional view showing a part of the ball screw mechanism shown in FIG. 2.
Figure 4:
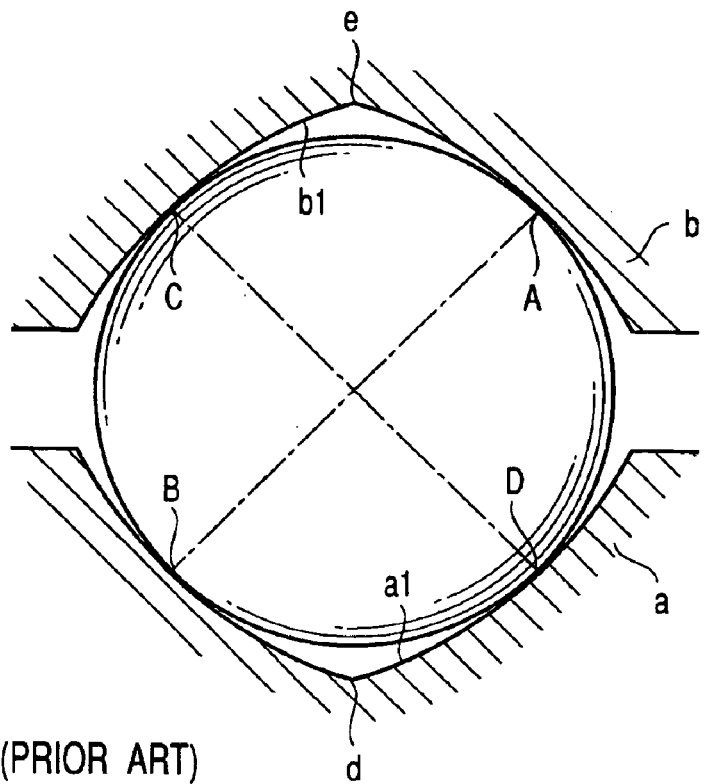
FIG. 4 is a sectional view showing a part of a conventional ball screw mechanism.

As shown in FIG. 3, the cross-sectional shape of the loaded surface 20a is the shape of a circular arc that has a radius of curvature $R_1$ larger than the radius of the balls 18 and smaller than the diameter of the balls 18. This radius of curvature $R_1$ may be larger than the diameter of the balls 18. On the other hand, the cross-sectional shape of the unloaded surface 20b is the shape of a substantially straight line that inclines at an angle to the direction of the nut member 17.

In the ball screw groove 19 formed on the screw shaft 16, a surface on one side of its groove base 19c forms a loaded surface 19a, and a surface on the other side forms an unloaded surface 19b. The loaded surface 19a is situated on that side of the groove base 19c of the ball screw groove 19 in the first axial direction F1. The unloaded surface 19b is situated on that side of the groove base 19c of the ball screw groove 19 in the second axial direction F2.

In other words, the loaded surface 19a is situated more remotely from the fixed pulley disk 1 with respect to the groove base 19c of the ball screw groove 19, while the unloaded surface 19b is situated nearer to the fixed pulley disk 1 with respect to the groove base 19c of the ball screw groove 19. Thus, the loaded surface 19a of the one ball screw groove 19 and the loaded surface 20a of the other ball screw groove 20 face each other with the balls 18 between them.

As shown in FIG. 3, the cross-sectional shape of the loaded surface 19a is the shape of a circular arc that has the same radius of curvature $R_1$ as that of the loaded surface 20a of the nut member 17. The cross-sectional shape of the unloaded surface 19b is the shape of a circular arc that has a radius of curvature $R_2$ less than the curvature radius $R_1$. The center C2 of the radius of curvature $R_2$ of the unloaded surface 19b is situated nearer to the groove base 19c of the ball screw groove 19 than the center C1 of the radius of curvature $R_1$ of the loaded surface 19a. The loaded surface 19a and the unloaded surface 19b are smoothly continuous with each other with the groove base 19c between them.

When the balls 18 that are accommodated between the ball screw grooves 19 and 20 are individually in contact with the loaded surfaces 19a and 20a, a gap S is formed between each of the unloaded surfaces 19b and 20b and each ball 18.

The ball screw grooves 19 and 20 are individually formed by cutting work. The respective loaded surfaces 19a and 20a of the cut ball screw grooves 19 and 20 are precision-finished by polishing or grinding. The unloaded surfaces 19b and 20b are left roughly finished by cutting work without being precision-finished. Therefore, the surface roughness of the loaded surfaces 19a and 20a is lower than that of the unloaded surfaces 19b and 20b.

The nut member 17 of the ball screw mechanism 15 is mounted on the movable pulley disk 2 by means of a bearing 25 and a bearing holder 26. A boss portion 2a is formed in the central portion of the back side of the movable pulley disk 2. The bearing 25 is located on the outer periphery of the boss portion 2a.

The bearing 25 includes an inner race 25a, an outer race 25b, and a plurality of balls 25c that are loaded for rolling motion between the inner race 25a and the outer race 25b. The inner race 25a is fitted and fixed on the outer periphery of the boss portion 2a of the movable pulley disk 2.

The cylindrical bearing holder 26 is provided between the outer peripheral surface of the outer race 25b and the inner peripheral surface of one end portion of the nut member 17. The outer peripheral portion of the bearing holder 26 is formed having a pair of protrusions 28 that are situated on the opposite sides of the rotating shaft 5. A pair of recesses 29 corresponding individually to the protrusions 28 are formed in the end face of the nut member 17. The protrusions 28 are fitted in the recesses 29, individually. This engagement prevents the bearing holder 26 from rotating with respect to the nut member 17. Thus, the nut member 17 and the bearing holder 26 can rotate integrally with each other.

The nut member 17 and the bearing holder 26 are rotatably supported on the movable pulley disk 2 by means of the bearing 25. Besides, the nut member 17 and the bearing holder 26 can move integrally with the movable pulley disk 2 in the axial direction of the rotating shaft 5.

An annular collar 30 that projects inside the bearing holder 26 is formed on the inner peripheral portion of the bearing holder 26. One side face of the collar 30 is in contact with the end face of the outer race 25b of the bearing 25. A stopper projection 31 is formed on a part of the other side face of the collar 30. The stopper projection 31 extends toward the cylindrical screw shaft 16.

A stopper pin 32 is inserted into one end portion of the screw shaft 16. When the nut member 17 rotates and moves away from the fixed pulley disk 1 for a given distance, the stopper projection 31 abuts against the side face of the stopper pin 32. Thereupon, the nut member 17 is stopped from further rotating, so that the ball screw mechanism 15 is prevented from being tightened excessively.

The stopper pin 32 is a spring pin formed of a metallic pipe, for example, and has a slit formed extending in its axial direction. The stopper pin 32 is fixed in a pin insertion hole of the screw shaft 16 by being inserted into the pin insertion hole with its diameter reduced.

A driving gear 36, formed of a spur gear, for example, is provided on the outer peripheral portion of an intermediate part of the nut member 17. Since the turning force of a drive source, such as a motor, is transmitted to the nut member 17 through the driving gear 36, the nut member 17 can be rotated in both directions, clockwise and counter-clockwise directions.

The following is a description of the transmission shift operation of the continuously variable transmission according to the embodiment. FIG. 1 shows a state in which the distance between the pulley disks 1 and 2, that is, the pulley width, is greatest. In this state, the stopper projection 31 abuts against the side face of the stopper pin 32.

If the nut member 17 in this state is rotated in a first rotating direction by means of the drive source, this rotation causes the balls 18 to move the nut member 17 toward the fixed pulley disk 1. The balls 18 are inserted between the ball screw groove 20 of the nut member 17 and the ball screw groove 19 of the screw shaft 16. If the nut member 17 moves toward the fixed pulley disk 1, therefore, the movable pulley disk 2 moves integrally with the nut member 17 toward the fixed pulley disk 1. Thus, the distance (pulley width) between the pulley disks 1 and 2 is reduced.

If the nut member 17 rotates in the opposite direction (second rotating direction), the nut member 17, urged by the balls 18, moves away from the fixed pulley disk 1. If the nut member 17 moves in this direction, the movable pulley disk 2 is urged by the push force of the endless belt 4 to move away, along with the nut member 17, from the fixed pulley disk 1. Thus, the distance between the pulley disks 1 and 2 increases.

If the nut member 17 rotates in the aforesaid second rotating direction so that the nut member 17 moves a given distance from the fixed pulley disk 1, the stopper projection 31 abuts against the side face of the stopper pin 32. By this engagement, the nut member 17 is stopped from further rotating, so that the ball screw mechanism 15 is prevented from being tightened excessively.

As the pulley width continuously changes in this manner, the endless belt 4 continuously changes its position in the diametrical direction of the pulley 3. Thereupon, the transmission ratio for rotation that is transmitted from the primary pulley on the driving side to the secondary pulley on the driven side by means of the endless belt 4 is adjusted for continuous variation.

In the belt-type continuously variable transmission in which the endless belt 4 is held between the fixed pulley disk 1 and the movable pulley disk 2, a component of force based on the tension of the endless belt 4 always acts in the direction to move the movable pulley disk 2 away from the fixed pulley disk 1. Thus, the nut member 17 moves in the first axial direction F1 or in the second axial direction F2 in a manner such that it is continually subjected to a load in the first axial direction F1.

If the nut member 17 moves in either direction, the first axial direction F1 or the second axial direction F2, therefore, the balls 18 are pressed against the respective loaded surfaces 19a and 20a of the ball screw grooves 19 and 20.

The respective loaded surfaces 19a and 20a of the ball screw grooves 19 and 20 are finished by polishing or grinding, and their surface roughness is very low. Accordingly, the balls 18 can smoothly roll with high accuracy, so that the movable pulley disk 2 can be operated accurately.

In the manufacture of the screw shaft 16, the ball screw groove 19 is formed on the outer peripheral surface of the screw shaft 16 by cutting work. In the manufacture of the nut member 17, the ball screw groove 20 is formed on the inner peripheral surface of the nut member 17 by cutting work. Further, only the respective loaded surfaces 19a and 20a of the ball screw grooves 19 and 20, that is, the loaded surfaces 19a and 20a against which the balls 18 are pressed, are finished by polishing or grinding. The unloaded surfaces 19b and 20b against which the balls 18 are not pressed are not finished. Accordingly, the unloaded surfaces 19b and 20b are only cut and left as they are, so that they are higher in surface roughness than the loaded surfaces 19a and 20a.

Thus, finishing work for the respective unloaded surfaces 19b and 20b of the ball screw grooves 19 and 20 is omitted. By doing this, the efficiency of manufacture of the screw shaft 16 and the nut member 17 can be improved, and the cost can be lowered. Since the balls 18 are not pressed against the unloaded surfaces 19b and 20b, the operational accuracy of the ball screw mechanism 15 cannot be lowered if the surfaces are not finished.

In the ball screw mechanism 15, the ball screw groove 20 of the nut member 17 has the spiral length for one pitch, and the balls 18 are returned from the one end of the ball screw groove 20 to the other end by means-of the deflector 21. Thus, the ball-screw mechanism 15 has the single-thread, single-column ball screw structure. However, this structure is not essential. Alternatively, for example, the ball screw groove of the nut member may be formed having a spiral length for a plurality of pitches. In this case, one and the other end portions of the groove are internally connected by means of a tube.

The gaps S between the unloaded surfaces 19b and 20b and the balls 18 are not essential, and the unloaded surfaces 19b and 20b and the balls 18 may be in contact with one another.

This invention may be applied to an actuator device for actuating movable members of various apparatuses, as well as to a belt-type continuously variable transmission having a ball screw mechanism.

Further, the invention may be applied to an apparatus in which a nut member of a ball screw mechanism is fixed, and a screw shaft is rotated as it is moved in its axial direction, whereby the position of a movable member is shifted. Thus, the present invention may be applied to an apparatus in which the movable member is driven by relatively moving the nut member and the screw shaft in the axial direction.

What is claimed is:

1. An actuator device for manipulating a movable member, comprising:

a screw shaft having a ball screw groove formed on an outer peripheral surface thereof;

a nut member located on the outer periphery of the screw shaft and having a ball screw groove formed on an inner peripheral surface thereof; and a plurality of balls housed between the ball screw groove of the screw shaft and the ball screw groove of the nut member, wherein the nut member moves relatively to the screw shaft in a first axial direction and a second axial direction opposite thereto in a manner such that the nut member is continually subjected to a load in the first axial direction; the ball screw groove of the screw shaft has a loaded surface, which is formed on a groove base thereof, which extends in the first axial direction and which is pressed against the balls by the load in the first axial direction, and an unloaded surface which is formed on the groove base and which extends in the second axial direction; the ball screw groove of the nut member has a loaded surface, which is formed on a groove base thereof, which extends in the second axial direction and which is pressed against the balls by the load in the first axial direction, and an unloaded surface which is formed on the groove base and which extends in the first axial direction, the respective loaded surfaces and unloaded surfaces of the ball screw grooves, only the loaded surfaces are finished so that the surface roughness thereof is lower than that of the unloaded surfaces.

2. An actuator device for manipulating a movable member according to claim 1, wherein the surface roughness of the finished loaded surfaces is lower than the surface roughness of the machined unloaded surfaces.

3. An actuator device for manipulating a movable member according to claim 2, wherein the movable member is a movable pulley disk for a belt-type continuously variable transmission, and the belt-type continuously variable transmission has the cylindrical screw shaft fixed to a supporting member, the nut member provided on the outer periphery of the screw shaft, a rotating shaft inserted into the screw shaft, extending in the axial direction thereof and rotatable with respect to the screw shaft, a fixed pulley disk which rotates together with the rotating shaft, and the movable pulley disk provided on the rotating shaft to face the fixed pulley disk and to move together with the nut member in the axial direction of the rotating shaft.

4. An actuator device for manipulating a movable member according to claim 1, wherein the movable member is a movable pulley disk for a belt-type continuously variable transmission, and the belt-type continuously variable transmission has the cylindrical screw shaft fixed to a supporting member, the nut member provided on the outer periphery of the screw shaft, a rotating shaft inserted into the screw shaft, extending in the axial direction thereof and rotatable with respect to the screw shaft, a fixed pulley disk which rotates together with the rotating shaft, and the movable pulley disk provided on the rotating shaft to face the fixed pulley disk and to move together with the nut member in the axial direction of the rotating shaft.

* * * * *

UNITED STATES PATENT AND TRADEMARK OFFICE
CERTIFICATE OF CORRECTION

PATENT NO. : 6,860,827 B2
DATED : March 1, 2005
INVENTOR(S) : R. Otaki et al.

It is certified that error appears in the above-identified patent and that said Letters Patent is hereby corrected as shown below:

Column 9,
Line 1, "claim 2," should read -- claim 1 --

Column 10,
Line 2, "claim 1," should read -- claim 2 --

Signed and Sealed this

Twenty-eighth Day of June, 2005

JON W. DUDAS
*Director of the United States Patent and Trademark Office*